3,152,361
METHOD AND APPARATUS FOR FORMING FOAMED MEMBERS

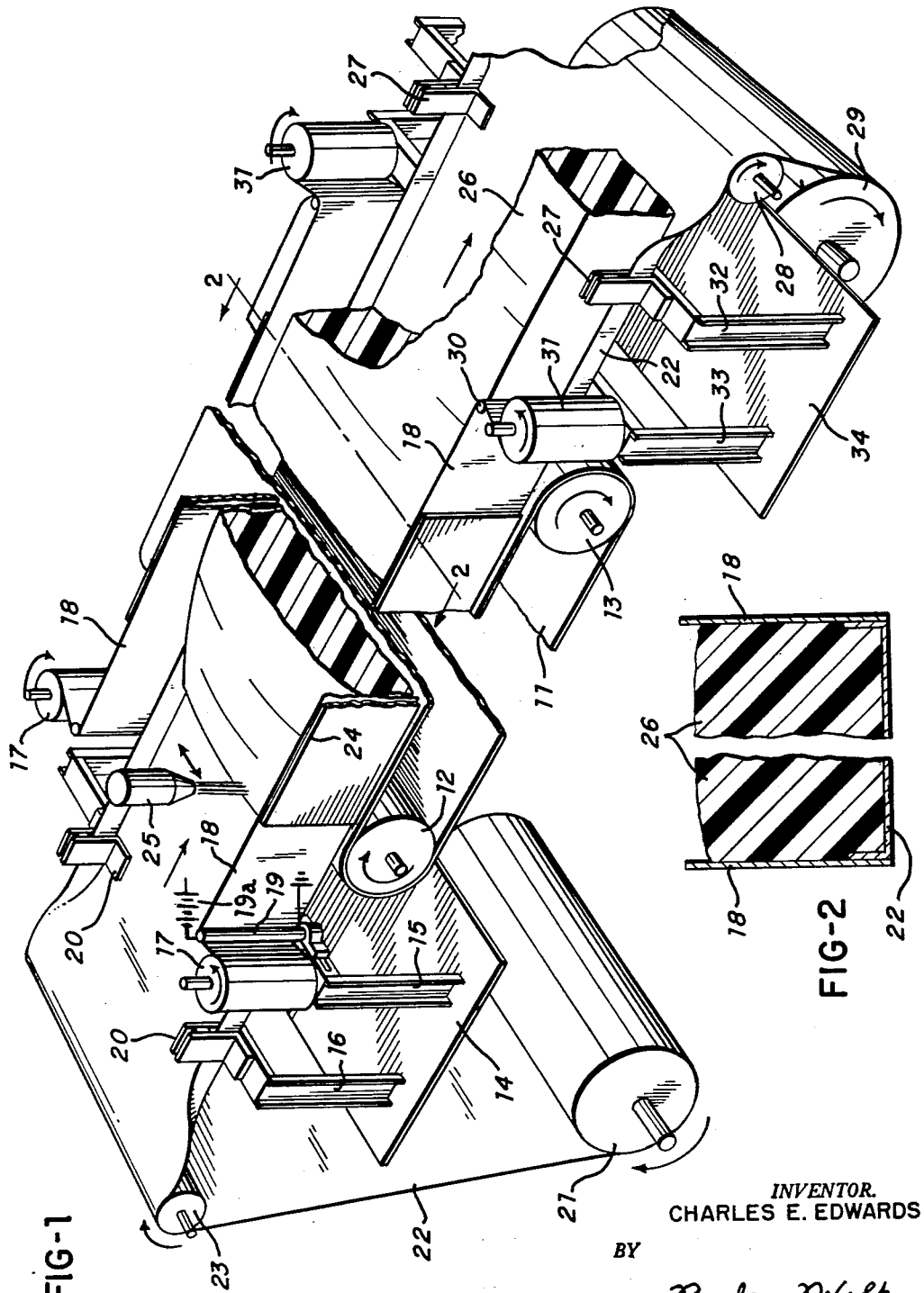

Charles E. Edwards, Waynesville, N.C., assignor to Dayco Corporation, Dayton, Ohio, a corporation of Ohio
Filed June 21, 1962, Ser. No. 204,260
3 Claims. (Cl. 18—4)

This invention relates to a method and apparatus for forming foamed members, particularly members made of urethane foam which are commonly referred to as "buns."

In the manufacture of urethane foam buns it is conventional to deposit the foam material onto a conveyor belt from an overhead position, the foam passing from the head in a liquid form but immediately beginning to foam upon the conveyor. As the material rises it passes continuously along with the conveyor belt until a bun or continuous member having a desired dimension is formed on the belt. This bun is then carried to the end of the conveyor system where it is removed and cut to the desired length. In order to prevent the foam from adhering to the conveyor belt, it is desirable to provide an intermediate member upon the conveyor. For this purpose it is common to use paper, but in the present invention the use of paper having a specific relationship to the conveyor is suggested for the first time. By means of the invention, paper is supplied from three separate sources to form the bottom and side members in which the foam is deposited. The paper may, if desired, be rerolled at the end of the conveyor system for reuse. This arrangement permits great economy in the use of paper, since it is no longer necessary to carry a large variety of widths in accordance with the width of the bun as in normal practice. Instead, the same paper may be used, with the amount of fold accounting for the variations in width.

It is, therefore, a primary object of this invention to supply a reusable paper liner for conveying urethane foam material.

It is a further object of the invention to provide individual paper liners for the sides and bottom of the conveyor system.

These and other objects of the invention will be apparent from the following description and drawings, in which:

FIGURE 1 is a perspective view of a typical urethane foam conveyor system.

FIGURE 2 is a sectional view taken along lines 2—2 of FIGURE 1.

Turning now to FIGURE 1, reference numeral 11 designates the conveyor belt upon which the foam material is deposited. This belt passes about rollers 12 and 13 and is driven by conventional driving means (not shown). Mounted at the left-hand side of the drawing is a structural support member 14 upon which are mounted a pair of vertical supports 15 and another pair of vertical supports 16. Upon the supports 15 is mounted a roller 17 upon which is wound an oiled or waxed paper which is capable of resisting the clinging effect of the foam. As can be seen, a roller 17 is mounted at either side of the conveyor and is capable of unrolling in the direction of the arrows so that the paper 18 is fed off the roller at right angles to the conveyor belt. The paper is first passed over an idler 19 to change the direction as shown.

Another and larger roller 21 is mounted behind and beneath the conveyor and carries a larger roll of paper 22 which is slightly wider than the width of the conveyor belt. This paper passes over a directional roller 23 and through the members 20 which turn up the ends at right angles as shown in the drawing. These members 20 are mounted on the structural member 16. The paper 22 with its turned edges is thus placed against the upper surface of the conveyor belt and travels along until it reaches a point opposite the idler rollers 19. At this point the rollers 19 deposit their paper 18 outside the turned up edges of the paper 22, thus forming a complete box-shaped member. Guide members 24 mounted at right angles to the conveyor belt tend to keep the turned up edges of the paper 22 and the sheets of paper 18 in line, the latter being contiguous with the guide means. As the paper passes along the conveyor, the conventional foaming head 25 deposits the mixed liquid foam components as it reciprocates transversely of the direction of travel of the belt, as shown by directional arrows in FIGURE 1. This foam gradually rises to form the bun but is prevented from adhering to the conveyor belt by means of the paper members 18 and 22.

As the completed foam member or bun 26 reaches the right end of the assembly as shown in FIGURE 1 it may be removed. At the same time, the paper 22 passes through another pair of right angle members 27 which are similar to the members 20, which flattens the paper. This paper then passes over the roller 28 and is rerolled on the take-up roller 29, as shown. At the same time, the paper members 18 are passed around a pair of idler rollers 30 and rerolled on take-up rollers 31. The side members 27 are mounted on structural members 32 and the take-up rollers 31 are mounted on structural members 33, both of which are mounted in turn on a structural plate 34.

As a variation of the method previously described, the paper may be partially or wholly coated with a heat-sensitive adhesive on one surface. When the paper members reach the rollers 19, they are caused to adhere together by means of heat. The heat may be supplied from an electrical heat source, such as designated by reference numeral 19a, to which the rollers 19 are connected. The bonded paper members thus form a unitary member and overcome any tendency of the sheets to lift up. When the paper reaches the members 27, they are separated by these members which act as stripping means. Since the adhesive portion is not reusable, the paper in this instance might be discarded, or fresh adhesive might be applied to the appropriate portion thereof. Alternatively, the adhesive might be pressure sensitive and the sheets may be adhered by the pressure of rollers 19.

It can thus be seen that the foamed bun is prevented from sticking to the conveyor by passing a horizontal sheet of paper having turned up edges along the conveyor, while at the same time side members of paper form a three-way enclosure. When the bun has been conveyed to the end of its run the sheets of paper are then rerolled and may be reused by the simple expedient of transferring the full roll from the take-up position to the feed position.

The specific modification of the invention shown is merely illustrative and not intended to be limiting. Other modifications in the apparatus may be made without departing from the spirit of the inventive concept.

I claim:

1. In an apparatus for forming continuous urethane foam members including a conveyor, the improvement comprising feeding means mounted adjacent said conveyor for placing paper backing sheets on said conveyor, folding maens mounted adjacent said conveyor for folding said paper backing sheets to provide side members, and additional feeding means for placing paper sheets at right angles to said backing sheets and contiguous with said side members.

2. In an apparatus for forming continuous urethane foam members including a conveyor and means for depositing liquid components thereupon, the improvement comprising a plurality of paper feeding means mounted adjacent said conveyor, means for placing a paper backing on said conveyor while forming right angle portions therein, guide means mounted above and at right angles to said conveyor, and means for placing additional paper members within said guide means and adjacent the right angle portions of said paper backing.

3. The apparatus of claim 2 including means for rewinding said paper members.

References Cited in the file of this patent

UNITED STATES PATENTS

| | | |
|---|---|---|
| 2,441,235 | Blair et al. | May 11, 1948 |
| 2,827,665 | Rogers et al. | Mar. 23, 1958 |
| 2,841,205 | Bird | July 1, 1958 |
| 2,921,364 | Fischer | Jan. 19, 1960 |
| 3,056,168 | Terry | Oct. 2, 1962 |
| 3,076,226 | Borton et al. | Feb. 5, 1963 |
| 3,091,364 | Hackert | June 4, 1963 |

Notice of Adverse Decision in Interference

In Interference No. 95,408 involving Patent No. 3,152,361, C. E. Edwards, METHOD AND APPARATUS FOR FORMING FOAMED MEMBERS, final judgment adverse to the patentee was rendered June 13, 1968, as to claims 1 and 2.

[*Official Gazette December 17, 1968.*]